Jan. 27, 1931.  M. A. BLAIN  1,790,532
PROPELLER WITH VARIABLE PITCH
Filed June 9, 1927   2 Sheets-Sheet 1
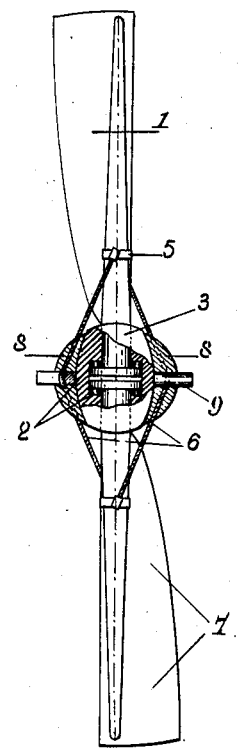
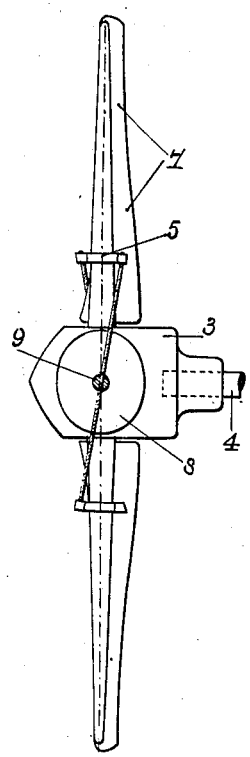
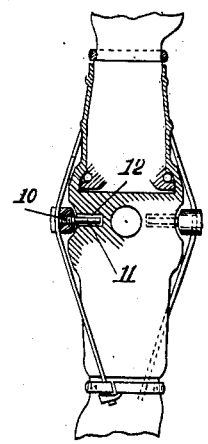
INVENTOR
Maurice A. Blain

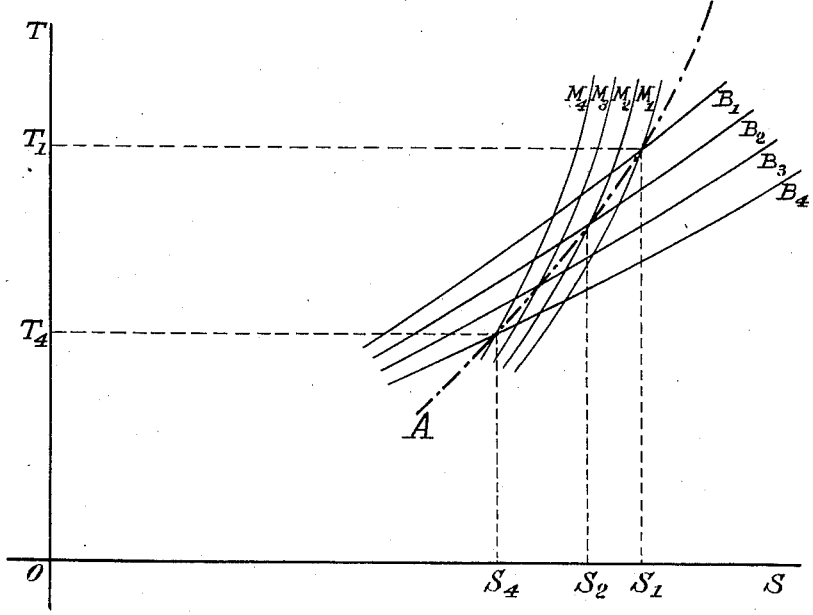

Patented Jan. 27, 1931

1,790,532

UNITED STATES PATENT OFFICE

MAURICE AUGUSTE BLAIN, OF PONTANEVEAUX, FRANCE

PROPELLER WITH VARIABLE PITCH

Application filed June 9, 1927, Serial No. 197,715, and in France June 14, 1926.

The present invention relates to improvements in propellers or actuated devices of the helical type in which the pitch may be modified by changing the angular position of the blades.

I consider that in order to obtain a reliable, accurate and instantaneous control of the angular position of the propeller blades, this control should be automatic, and for this purpose I make use of the natural forces set up in the propeller when functioning, such forces being placed in opposition to the requisite degree. It has been found by previous experience in this field that such forces are an obstacle to the proper operation of propellers of this class, but herein I reduce this obstacle by the use of such forces for the automatic control of the pitch of the propeller blades, and by so disposing the apparatus that such forces will be mutually compensated or annulled.

One of the said forces is the great effort of torsion in each propeller blade when operating, but since the movable blade must be necessarily pivoted, any controlling device will represent a disadvantage. In my said apparatus all such mechanism is eliminated, and the torsional stress is compensated by the control of the pitch, but is also annulled as concerns the arm of the blade which is no longer obliged to support it. For this purpose I displace the blade surface with reference to the axis of pivotation, and suitably bring the said axis adjacent the leading edge or the rear edge of the blade. A collar or hoop is mounted upon the arm of the blade and the torsional stress is brought upon the said collar, and I employ suitable tensioning cables which are attached to the collar to transmit statically the said stress in such manner as to obtain the automatic control of the pitch.

The centrifugal force represents another natural force which is an obstacle to the practical use of pivoting blades, and during the rapid rotation of the propeller, the pivoting mechanism will be jammed or damaged by the centrifugal force. In my said apparatus I might bring the centrifugal force which acts upon the mass of the propeller blade into opposition with the torsional stress and thus provide for the automatic adjustment of the pitch of the blade, but I prefer to combine the centrifugal action of independent heavy masses or weights which are interposed for the purpose below the tensioning members and to thus offer a traction such that the resulting force will be utilized firstly to equilibrate the centrifugal action of the blade itself whereby the pivoting mechanism will be relieved and secondly to compensate the torsional effect and thus regulate the angular position of the propeller blade.

The appended drawings show by way of example a constructional form of the apparatus in accordance with the invention. Fig. 1 shows the details of a propeller in front view, and Fig. 2 is a side view of the same propeller. Fig. 3 is a partial cross-sectional view of a modification. Fig. 4 is a chart illustrating the operation of the device. The blades 1 are pivoted at 2 upon the hub 3. The said hub is keyed to the driving shaft 4. A collar or hoop 5 which is securely mounted in the proper position on the upper part of the arm of the blade serves to transmit to the tensioning cable 6 the torsional stress which is produced upon the surface of the blade 7 when functioning; herein the surface of the wing has an outward position inasmuch as the pivot axis is brought towards the leading edge. The two independent heavy masses or weights 8 are respectively traversed by one of the tensioning cables 6, said weights being free in the direction in which the action of the centrifugal force tends to move them, so as to transmit to the said cables, which in this case retain them, the effect of this action, but they are guided by the split axles or spindles 9 which are secured to the hub, so as to follow all the other movements which may be effected by the device.

The shape of the blades may be varied according to circumstances, so as to change the position of the center of thrust relatively to the axis of pivotation of the blades, and I prefer to employ a shape such that the center of thrust will be spaced at 70 m/m from the axis of pivotation and towards the rear edge of the blade.

In a modification shown in Fig. 3 the said weights, instead of being slidable upon spindles, are mounted upon a screw 10 whose smooth part 11 is movable in a guiding recess 12. It should be noted that by this construction I am enabled to change the initial position of the center of gravity of the said weights and hence the pressure of the said weights upon the cable. This arrangement is of particular importance, since it is quite impossible to exactly ascertain the weight of each mass.

The said flexible tensioning cables may be obviously replaced by rigid mechanical connections of a suitable nature.

The operation is explained as follows:

The center of pressure of the air against each blade is located between the axis of revolution of the blade and one of the edges, either the leading or the following edge; it follows therefore that, disregarding the masses, the blades rotate in such a fashion that their plane is located in the plane of rotation of a helix of such sort that said helix will not have any propulsive or tractive action; in other words, the pitch of the helix will be nil.

On the other hand, the cables are fixed to the blades at such points that when the masses are closest to the hub, the helix described by the blades has the minimum pitch.

Under the influence of the velocity of rotation of the propeller, these masses are subject to centrifugal force and tend to move away from the hub. In doing this they therefore cause a traction on the cables and these being rolled for a fraction of a turn around the propeller blades tend to unroll and the point of attachment of the cables to the blades is positioned in such a way that in unrolling, the cables rotate the blades around their axes in such a direction that the pitch of the helix that is to say, the pitch of the propeller, is augmented. It is obvious therefore, that if the pitch increases, the resistance of the propeller to the air pressure also increases. Therefore, if the speed of rotation of the propeller tends to increase, the air resistance to rotation of the propeller increases, and vice versa. This results in a stabilizing function inasmuch as centrifugal force engendered in the masses by increase in the speed of the propeller is opposed by corresponding increase in the resistance of the air upon the blades of the propellers.

Referring to Figure 4, the operation of the device will be explained.

Two couples are exerted on each blade of the propeller which tend to rotate the blade around its own axis; these couples are of opposite direction.

Firstly, there is a couple due to the resistance of the air, or "resistant couple" which tends to rotate the blade, so that the pitch screw will be minimum; it is, of course, understood that this couple depends on the pitch, that is to say, the angle at which the blade has rotated about its own axis. The curve $B_1$ represents this couple, in function with the rotational speed S of the propeller. The curves $B_2$, $B_3$, $B_4$ represent smaller curves for successively decreasing pitches.

The other couple or "motor couple" (or drive couple) which is exerted on each blade is due to the action of centrifugal force on the weighted masses provided on the propeller hub. This couple is transmitted to the blades through tensioning cables; it also depends on the pitch of the propeller. The cable is attached to the blade at a point such that the couple increases when the pitch decreases.

The curves $M_1$, $M_2$, $M_3$, $M_4$ represent the couple due to centrifugal force in function with the rotational velocity S of the propeller for pitches equal respectively to those corresponding to the curves $B_1$, $B_2$, $B_3$, $B_4$.

The points of operation are represented by the intersection of the curves $M_1$ and $B_1$, $M_2$ and $B_2$, etc. The curve of operation is thus represented by the curve A, B.

Assume that at a given moment the velocity is $s_2$ equals $O S_2$. The pitch is then $p_2$; the couple $b_2$, due to the thrust of air on the blade, balances the couple $m_2$, due to the action of centrifugal force on the weighted mass.

1. If the speed of the motor which drives the propeller increases and becomes $s_1$ equals $O S_1$, the opposed couples become $b_1$ and $m_1$. The characteristic point of operation moves on curve A. B. and stops at the intersection of curves $B_1$ and $M_1$; in this position the couple $b_1$ and $m_1$ are equal (their distance is represented by the distance $O T_1$), so that the blade is in equilibrium. It is apparent that the pitch of the propeller is increased; thus the resistance couple on the propeller shaft increases. The operation is hence stable.

2. If the speed of the motor decreases and becomes $s_4$ equals $O S_4$, the characteristic point of operation comes at the intersection of curves $B_4$ and $M_4$. There is then equilibrium between the couples $b_4$ due to the air and $m_4$ to the centrifugal force on the weighted masses; these couples are then equal to $O T_4$.

It is apparent that this position corresponds to the low pitch, hence the resistant couple is less and operation is stable.

Summarizing, the propeller pitch varies in the same direction as the rotational velocity; which decreases if the velocity decreases and increases if the velocity increases. A position of equilibrium corresponds to each velocity. However, at very low speeds the equilibrium is indifferent, the pitch may be of any kind, but this presents no inconvenience, because an aerial propeller is never used at low speed.

As soon as the speed increases the couples arise and assure regulation.

We may consider A. B. (Fig. 4) as the useful (or efficient) part of the operative curve; before the point A the speed is too low and the couples are negligible; at the point B the pitch is maximum and the mechanism is such that the blade can no longer rotate.

When the pitch is minimum (point A), if the speed increases the couple due to the air resistance increases, but the couple due to the weights increases also to an extent sufficient to overcome the couple due to the air, so that the blade turns in the direction of the increasing pitches to a new position of equilibrium.

When the pitch is maximum (point B), if the speed decreases, the couple due to the air resistance decreases, but the couple due to the weights decreases sufficiently so that the blade rotates in the direction of the decreasing pitches to a new position of equilibrium.

Having now particularly described my invention, and in what manner the same is to be performed, I claim as my invention:

1. A propeller with variable pitch such that the thrust center on each blade is offset with respect to the pivotal axis of said blade, including masses placed at each side of the propeller shaft, guiding means upon which said masses are arranged to move along a common axis perpendicularly to the axis of the propeller shaft and to the pivotal axis of the blades, and flexible means connecting said masses with points of the blades located at the side of their pivotal axis.

2. A propeller according to claim 1 in which each mass is mounted upon a rod which is slidable in a suitable guide formed in the hub.

Signed at Lyon, France, this 31st of May, 1927.

MAURICE AUGUSTE BLAIN.